S. H. HARRINGTON.
AUTOMATIC SIGNAL SYSTEM.
APPLICATION FILED APR. 10, 1909.
1,009,742.
Patented Nov. 28, 1911.
5 SHEETS—SHEET 1.
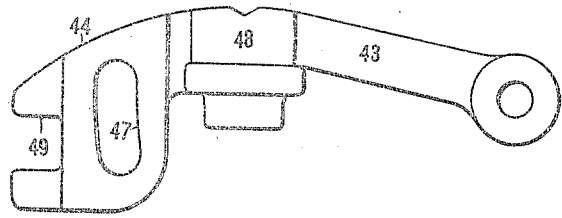
Fig. 8.
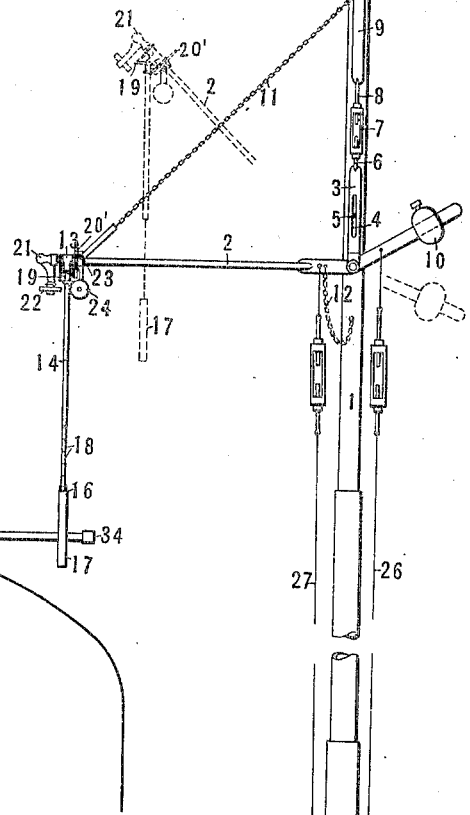
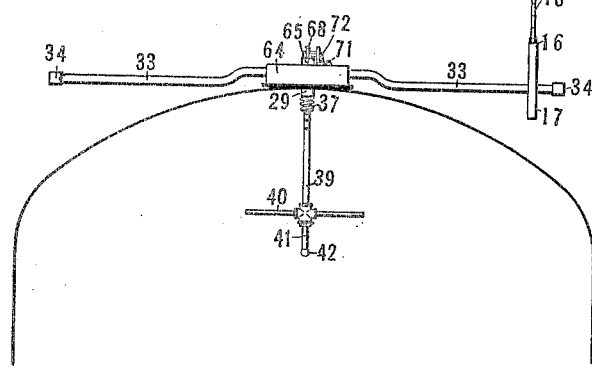
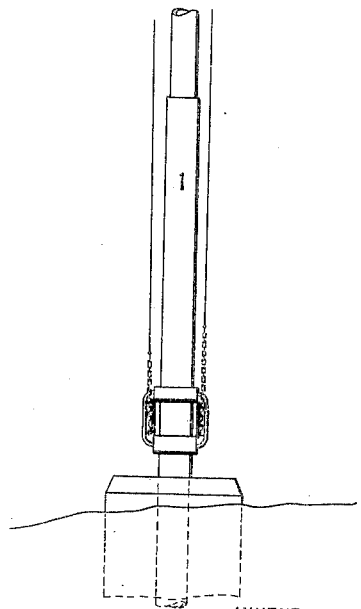
Fig. 1.
WITNESSES
INVENTOR
S. H. Harrington
BY
Duell, Warfield & Duell
ATTORNEYS

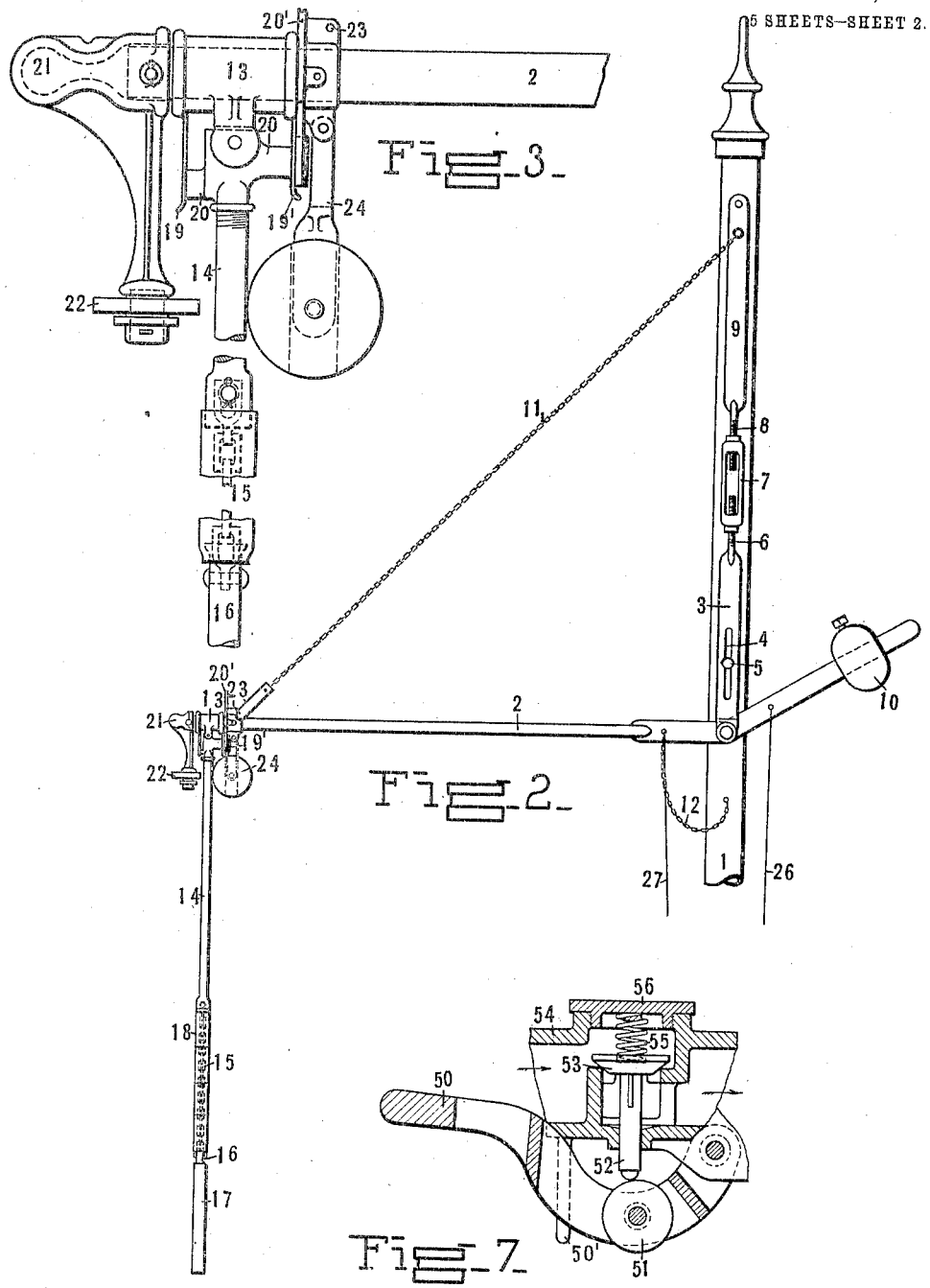

S. H. HARRINGTON.
AUTOMATIC SIGNAL SYSTEM.
APPLICATION FILED APR. 10, 1909.
1,009,742.
Patented Nov. 28, 1911.
5 SHEETS—SHEET 3.
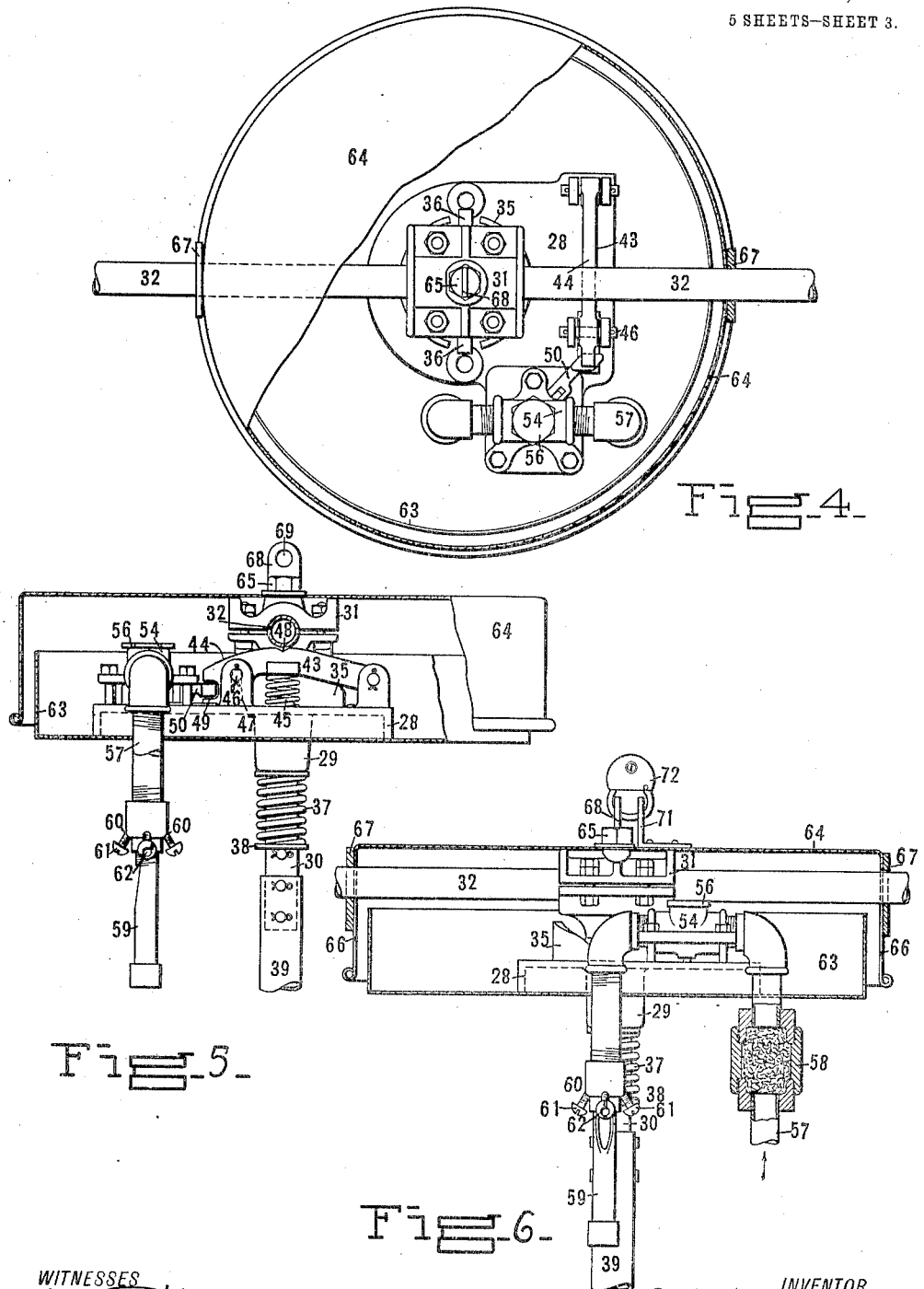

S. H. HARRINGTON.
AUTOMATIC SIGNAL SYSTEM.
APPLICATION FILED APR. 10, 1909.
1,009,742.
Patented Nov. 28, 1911.
5 SHEETS—SHEET 4.
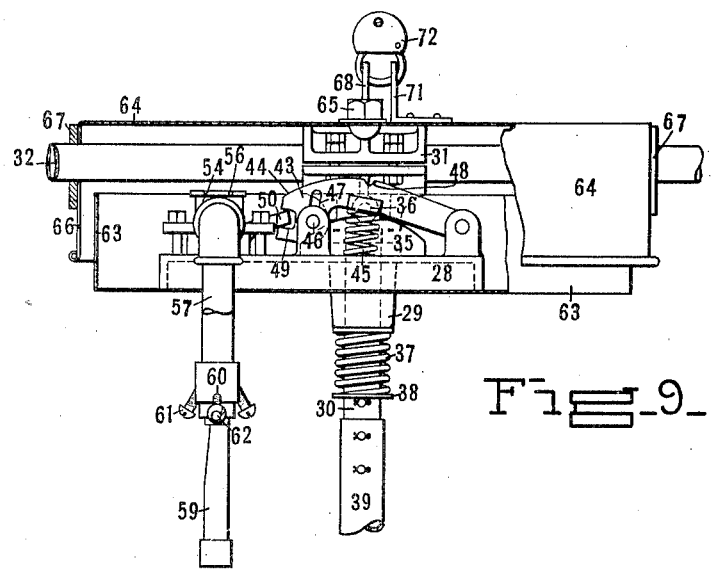
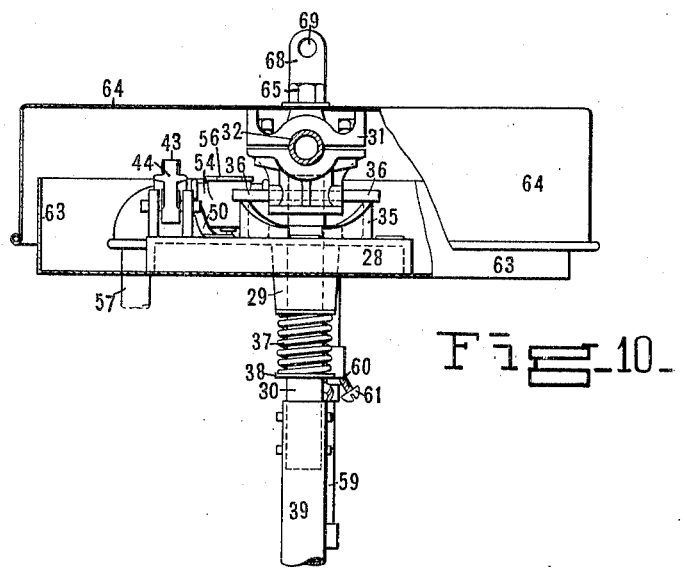

S. H. HARRINGTON.
AUTOMATIC SIGNAL SYSTEM.
APPLICATION FILED APR. 10, 1909.
1,009,742.
Patented Nov. 28, 1911.
5 SHEETS—SHEET 5.
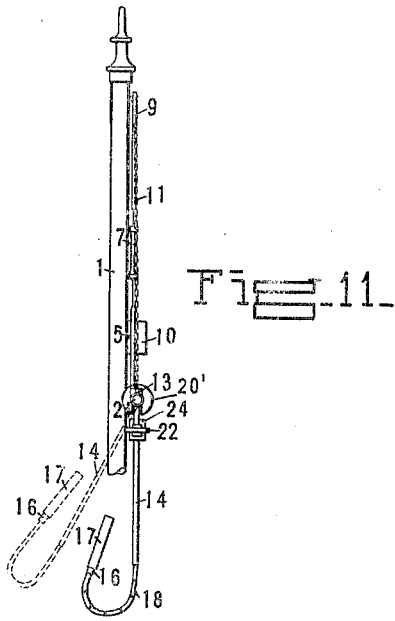
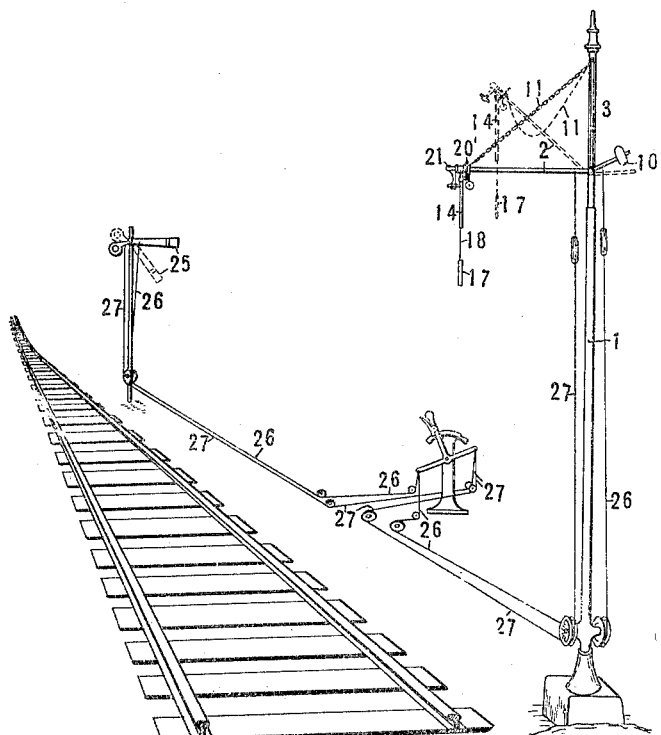

UNITED STATES PATENT OFFICE.

SAMUEL H. HARRINGTON, OF NEW YORK, N. Y.

AUTOMATIC SIGNAL SYSTEM.

1,009,742.

Specification of Letters Patent. Patented Nov. 28, 1911.

Application filed April 10, 1909. Serial No. 489,230.

*To all whom it may concern:*

Be it known that I, SAMUEL H. HARRINGTON, a citizen of the United States, residing at New York, in the county of New York and State of New York, have invented certain new and useful Improvements in Automatic Signal Systems, of which the following is a full, clear, and exact description, such as will enable others skilled in the art to which it appertains to make and use the same.

This invention relates to an improvement in railway safety devices, and more especially to devices of this character in which a member adjacent the track is utilized to slow down or stop a train.

One of the objects is to provide a practical device of this character which is positive and reliable in its action.

Another object is to provide means, operating simultaneously with the application of the brakes, for notifying the engineer that he is about to pass a danger signal.

Another object is to provide a device which is non-complicated and which is so constructed that the parts thereof will not be affected by the weather conditions.

Another object is to provide means for absorbing the shock between the brake-controlling mechanism and the track member.

Another object is to provide a device which is cheap and durable, and the parts of which may be readily adjusted in order that it may be used under varying conditions of track and rolling stock.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, wherein is illustrated one of the various possible embodiments of the invention, Figure 1 is a front elevation of the improved device, showing its position relative to a moving vehicle; Fig. 2 is an enlarged view of the upper portion of the post shown in Fig. 1; Fig. 3 is an enlarged detail view of the suspension device and its co-acting stops; Fig. 4 is a plan view of the brake-controlling mechanism carried by the moving vehicle, parts being broken away for the sake of clearness; Fig. 5 is an elevational view of the mechanism looking from the right of Fig. 4; parts being broken away for clearness; Fig. 6 is an elevational view of the mechanism looking from the left of Fig. 5; the casing being shown in section; Fig. 7 is a detail, sectional view of the valve and its actuating lever; Fig. 8 is an enlarged detail view of the cam lever; Fig. 9 is a view similar to Fig. 5, showing the parts in their alternate positions; Fig. 10 is a view taken from the right of Fig. 9; Fig. 11 is a view of the track member showing the position assumed by the suspended track member when struck by the arm carried by the vehicle; Fig. 12 is a diagrammatic view showing the relative position of the device with respect to a signal.

Similar reference characters refer to similar parts throughout the several views.

Referring now to Figs. 1, 2 and 3, 1 indicates a support or post of any suitable construction upon which the rotatable arm 2 is mounted. In the embodiment shown, the arm is pivoted to one end of a plate 3 having a slot 4 formed therein with which a bolt 5 or other suitable retaining device engages. The other end of the plate 3 is preferably provided with a threaded projection 6 with which a turn-buckle 7 engages, this turn-buckle also engaging with a threaded projection 8 provided at one end of a plate 9 which is fixed upon the support 1. It will be understood that by loosening the retaining means 5 and rotating the turn-buckle 7 the plate 3 may be raised or lowered to adjust the position of the arm 2 relatively to the track. An adjustable counterweight 10 is associated with the arm 2 and is so proportioned as regards its weight that it will be overbalanced by the arm 2 which will, therefore, assume its lowermost or operative position in the event of any of the connections between it and the signal becoming broken. Suitable flexible means such as chains 11 and 12 extend between the support and the arm for limiting its movement in both directions.

Rotatably mounted upon the arm 2 adjacent its outer end is a sleeve 13 to which one end of a downwardly extending rigid arm 14 is pivoted, the other end of which arm has a chain 15 secured thereto, and pivotally connected to the free end of this chain, in such a manner that it may swing parallel with the track, is a weight 16 preferably incased in rubber 17. The arm 14 and the chain 15 and weight 16 will hereinafter be referred to as the "suspension device." The chain 15 is preferably formed of a series of square links and, in the embodiment shown, is covered with a plurality of tubular rubber sections 18. Springs 19, 19' secured to the sleeve engage suitable lugs 20 upon the arm 14 and tend to maintain the suspension device in its normal position when the arm 2 is lowered. In order to prevent lateral movement of the suspension member while rotating on being struck by the train member, a disk 20' is secured to the arm 2, with one face of which disk the spring 19' is adapted to contact during its rotating movement. The disk is provided with a slot with which the spring 19' registers when the suspension member is in its normal position, in order that, when the arm 2 is raised, the suspension member may assume the position shown in dotted lines in Fig. 1. Secured to the outer end of the arm 2 is a bracket 21 within which a stop 22 preferably formed of rubber, is secured, this stop serving to prevent excessive movement of the suspension device away from the post. Pivotally mounted upon the arm 2 as at 23, and engaging the opposite side of the suspension device is a pendulum 24 the effective length of which is preferably less than the length of the suspension device, thus assuring that the pendulum will have a different natural period of vibration than the suspension device has. If the suspension device tends to swing toward the pole, it will start the pendulum vibrating, which, on account of its shorter rate of vibration as compared to the former, will tend to prevent excessive swinging movement thereof. The tendency of the weight 16 to swing relatively to the arm 14 is reduced to a minimum on account of the square form of the links of the chain and the tubular sections covering the same. It will be seen that any appreciable lateral movement of the suspension device or of the weight, with respect to the track is prohibited, thus insuring that when the arm is in its danger position the weight will be held in the path of the actuating device carried by the vehicle.

Referring now to Fig. 12 of the drawing the device is shown as being positioned in advance of the signal 25 which, in this instance, is represented as a semaphore, although it will of course be understood that any other signaling means may be utilized. Suitable connections 26 and 27 extend from the semaphore to the arm 2 which are so arranged and connected that when the semaphore is at its safety position the arm 2 will be raised to carry the weight 16 out of the path of the trains, as indicated in dotted lines, while if the semaphore is moved to danger position the arm 2 will be moved to its lowered position thereby positioning the weight 16 in the path of the trains, as indicated in solid lines. When the weight 16 is in its lowermost or operative position, it is adapted to be struck by an arm mounted upon a vehicle traveling upon the track, being preferably mounted upon the locomotive, as indicated in Fig. 1, and the arm and weight 16 are so adjusted relatively to each other that the former will strike the latter at its center of percussion with regards to its point of pivotal connection with the chain 15.

Referring now to Figs. 4 to 10, inclusive, 28 indicates a suitable base or plate preferably mounted upon the roof of the locomotive cab and provided with a bearing 29 within which a shaft 30 is journaled. A suitable clamp 31 is secured to the upper end of the shaft within which the bar 32 is adapted to be clamped, which bar is provided with outwardly extending arms 33 out of alinement therewith. In the embodiment shown, the bar and the arms are integral, being constructed from a tubular member having its end portion bent to form the offset arms, the outer ends being preferably closed by suitable caps 34. By means of this construction, it will be apparent that by loosening the clamp 31 the bar 32 may be rotated about its longitudinal axis to raise or lower the arms 33, if necessary, in order that they will be in such a position as to contact with the center of percussion of the weight 16.

In order to prevent excessive rotary movement of the bar 32 when the arms 33 are struck by the weight 16, curved cams 35 are supported upon the base 28 with which the cam engaging members 36, movable with the shaft 30, are adapted to engage when the bar rotates. These cams are so formed and positioned that the shaft 30 will be raised as the bar is rotated which movement of the shaft is opposed by a spring 37 engaging the bearing 29 and a collar 38 secured to the shaft. This device operates as a shock-absorber and tends to gradually retard the rotary movement of the bar on account of the fact that the upward movement of the shaft will be opposed by a constantly increasing resistance.

A suitable handle is secured to the shaft and is located within the cab by means of which the engineer may return the parts to their normal position. In the present instance this handle is shown as consisting of a pipe 39 secured to and extending downwardly from the shaft 30 and having a cross-piece 40 secured thereto adapted to be grasped by the hand and by means of which the shaft 30 and bar 32 may be rotated. Depending below the cross-piece 40 is a projection 41, provided preferably with a rounded terminal portion 42 adapted to engage the canvas which is at times stretched between the locomotive and the tender and prevent the same from contacting with the cross-piece 40 and so interfering with the rotation of the shaft 30.

A lever 43 preferably pivoted to the base 28 is provided with a cam surface 44 engaging the rotatable bar 32, being kept in its normally lowered or inoperative position thereby, and being urged upward by means of a spring 45, the movement of the lever being limited as by means of a pin 46 engaging a slot 47 formed in the free end thereof. The cam surface of the lever is so shaped that, upon the bar being rotated from its normal position, in which position it engages a recess 48 formed in the lever, and the lever being forced upward by the spring 45, the cam surface will tend to assist in the further rotation of the bar.

Operatively associated with the lever 43, as by engaging a recess 49 in its free end, is the valve actuating lever 50 pivotally mounted adjacent the valve which lever moves between suitable guides 50' and has a roller 51 pivotally mounted thereon adapted to engage the outwardly extending end of the valve stem 52. The valve 53 is normally maintained on its seat within its chamber 54 by means of a spring 55 extending between its upper surface and the removable cap 56. As the valve lever is actuated the roller engaging the valve stem will be rotated, thus constantly presenting fresh surfaces in contact with the valve stem and minimizing the wear of these parts. The valve chamber 54 communicates on its inlet side with piping 57 of the air-braking system and a suitable filter 58 is preferably interposed in the piping adjacent the inlet opening of the valve chamber to prevent any dirt or other foreign matter from passing therein.

The outlet opening of the valve chamber 54 communicates with an alarm 59 which, in the present instance, is represented as a whistle. Openings 60 are formed intermediate the alarm and the valve within which openings solid or hollow members 61 or 62 may be inserted, these members in the present instance being shown as screws. The purpose of this construction is to regulate the amount of air which is permitted to flow through the alarm. If for example the air-braking system is of comparatively high pressure, the openings may all be closed by the solid screws 61, thus forcing all the air to pass through the alarm; while on the other hand if the system is of comparatively low pressure, one or more of the solid screws may be removed and replaced by hollow ones, thus permitting sufficient air to pass out through the openings to efficiently apply the brakes.

In order to protect the various parts from the weather, they are inclosed within a casing comprising in the embodiment shown a fixed portion 63 secured to the locomotive and provided with an upwardly extending flange surrounding the parts, and a removable cover portion 64 having a downwardly extending flange surrounding and overlapping the flange of the fixed portion. This cover is preferably secured by a bolt or other suitable fastening means 65 to the clamping member with which it rotates and is further provided with slots 66 in its flange adapted to receive the bar 32, suitable rubber washers 67 being mounted upon the bar adjacent the slots to prevent foreign matter passing therethrough. The bolt 65 is preferably provided with an upstanding lug 68 having an opening 69 formed therein adapted to register with a similar opening formed in a lug 71 secured to the cover, through which openings any locking means, such as a padlock 72 may be passed to prevent unauthorized persons from removing the casing. When it is desired to have access to the parts for any purpose, it is merely necessary to unlock the padlock, and remove the bolt 65, after which the cover portion may be lifted off.

The operation of the device which should be largely obvious from the above description is as follows: The suspension device and the arms 33 are so adjusted relatively to each other that the arm will be in a position to contact with the weight 16 at its center of percussion when in its operative position, as hereinbefore described. This adjustment may be made by raising or lowering the arm 2 upon which the suspension device is mounted as above described, or by adjusting the position of the arms 33 carried by the locomotive or if desired by adjusting both of these members. If, now, when the arm 2 is in its lowermost or operative position the engineer, either through carelessness or through failure for any reason to observe the danger signal, attempts to pass the same, one of the arms 33 upon the locomotive will strike the weight 16 as a result of which the arm will be rotated, thus releasing the lever 43 and permitting the spring 45 to raise the same, as indicated in Fig. 9, to actuate the valve lever 50 thereby raising the valve 53 from its seat. The result of this will be to release the air within the air-braking system, thus applying the brakes, and simultaneously therewith the air so released will pass through the alarm, thus giving an audible signal to the engineer that a danger signal is about to be passed. When the track is clear and the signal indicates that the engineer is to proceed, it is merely necessary for him to grasp the cross-piece 40 and rotate the bar 32 to cause the arms 33 to assume their normal positions, this movement of the bar causing the lever 43 to be depressed, thus lowering the valve lever 50 and permitting the valve 53 to again be seated within its chamber 54 through the agency of the spring 55.

It will be seen from this description that the objects above enumerated as well as others are obtained. The parts are simple in construction and access to the mechanism upon the moving vehicle may easily be had in case any repairs or renewals are to be made. The device is positive in its action and reliable, as it has no delicate parts which are apt to get out of order. In practice the support for the suspension device is preferably placed about a thousand feet in advance of its associated signal, as it has been found out that trains running at a high rate of speed may be stopped within this distance by an application of the brakes. Owing to the peculiar construction of the parts and the relation of the arm 2 with respect to the weight 16, trains running at any speed may be checked without an undue shock to the brake-controlling mechanism, the advantages of which feature will be apparent.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Inasmuch as certain features herein disclosed have been held to constitute independent inventions, I reserve the right to deal with the same in divisional applications.

Having described my invention, what I claim as new and desire to secure by Letters Patent is:

1. In a device of the class described, in combination, a support, a plate secured thereto, a second plate movably secured thereto, a rotatable arm carried by said second plate, a suspension device carried by said arm, and means extending between said plates for adjusting the position of said second plate relatively to said first plate.

2. In a device of the class described, in combination, a support, a plate secured thereto, a second plate having a slot formed therein, means secured to said support and engaging said slot whereby said second plate is movably held in position thereon, a rotatable arm carried by said second plate, a suspension device carried by said arm, and means extending between said plates for adjusting the position of said second plate with respect to said first plate.

3. In a device of the class described, in combination, a support, a plate secured thereto, a second plate movably secured thereto, a rotatable arm carried by said second plate, a suspension device carried by said arm, and a turn-buckle extending between said plates for adjusting the position of said second plate with respect to said first plate.

4. In a device of the class described, in combination, a support, an arm movably mounted thereon, a suspension device carried thereby, and stops for preventing lateral swinging movement of said device, one of said stops being movable with respect to said arm.

5. In a device of the class described, in combination, a support, an arm movably mounted thereon, a suspension device carried thereby and having a certain natural period of vibration, and a swinging stop carried by said arm and co-acting with said suspension device, said stop having a different natural period of vibration from that of the suspension device.

6. In a device of the class described, in combination, a support, an arm movably mounted thereon a suspension device carried thereon and having a certain natural period of vibration, and a swinging stop pivoted to said arm and co-acting with said suspension device, said stop having a different natural period of vibration from that of said suspension device.

7. In a device of the class described, in combination, a support, an arm movably mounted thereon, a suspension device carried thereby, and a swinging stop carried by said arm and co-acting with said suspension device, said suspension device and said stop being of different lengths whereby their natural periods of vibration are different.

8. In a device of the class described, in combination, a support, an arm movably mounted thereon, a suspension device carried thereby, a swinging stop carried by said arm and co-acting with said suspension device, the length of said stop being less than the length of said suspension device whereby it will have a different natural period of vibration.

9. In apparatus of the class described, in combination, a vehicle, brake-controlling means upon said vehicle, means suspended in the path of said brake-controlling means adapted to engage and operate the same, said suspended means being mounted to swing, and means tending to prevent the swinging of said suspended means in a direction across the path of said vehicle.

10. In apparatus of the class described, in combination, a vehicle, brake-controlling means mounted upon said vehicle, a supporting member extending transversely of the path of said vehicle, a member mounted upon said supporting member and adapted to rotate entirely about the same, a flexible member secured to and suspended from said second member, and a weight suspended on said flexible member in the path of said brake-controlling means and adapted yieldingly to engage and operate the same.

11. In apparatus of the class described, in combination, a vehicle, brake-controlling means upon said vehicle, a chain suspended adjacent the path of said brake-controlling means and having its links formed to permit swinging in the direction of the path of travel of said vehicle and impede swinging in a direction across said path, and a weight suspended on said chain in the path of said brake-controlling means and adapted to engage and operate the same.

12. In apparatus of the class described, in combination, a vehicle, yielding brake-controlling means upon said vehicle, a swinging member suspended in the path of travel of said brake-controlling means and adapted to engage and operate the same, said swinging member being formed and mounted so as to place its center of percussion substantially at the point of engagement.

13. In apparatus of the class described, in combination, a locomotive, a swinging lever mounted upon the upper portion of said locomotive, a member yieldingly suspended in the path of said lever and adapted to engage and swing the same by its inertia, an air-brake controlling valve, a connection between said lever and said valve, whereby said valve is opened upon said lever being swung, a resiliently pressed member presenting a cam surface adapted to permit actuation of said lever from its normal position and then yieldingly oppose excessive swinging with increasing force, and manually controlled means for resetting said lever in normal position.

14. In apparatus of the class described, in combination, a vehicle, brake-controlling means upon said vehicle comprising a swinging member, yielding means suspended in the path of said member and adapted to engage the same and swing the same by its inertia to cause the actuation of the brakes of said vehicle, and means adapted to oppose movement of said swinging member from its normal position first with a certain force, then with less, and then with greater force to prevent excessive swinging.

15. In apparatus of the class described, in combination, a vehicle, brake-controlling means upon said vehicle comprising a swinging member, yielding means suspended in the path of said member adapted to engage the same and swing the same by its inertia to cause the actuation of the brakes of said vehicle, and a casing inclosing a portion of said brake-controlling means, one portion of which is secured to said swinging member to move therewith, and the other portion of which casing is secured to said vehicle.

In testimony whereof I affix my signature, in the presence of two witnesses.

SAMUEL H. HARRINGTON.

Witnesses:
PAUL A. BLAIR,
H. M. SEAMANS.